United States Patent [19]
White

[11] Patent Number: 5,385,351
[45] Date of Patent: Jan. 31, 1995

[54] REMOVABLE SHAFT SEAL
[75] Inventor: Hollis N. White, Hopkinsville, Ky.
[73] Assignee: White Hydraulics, Inc., Hopkinsville, Ky.
[21] Appl. No.: 988,869
[22] Filed: Dec. 10, 1992

Related U.S. Application Data

[63] Continuation-in-part of Ser. No. 847,850, Mar. 9, 1992, Pat. No. 5,213,343, which is a continuation of Ser. No. 305,376, Feb. 1, 1989, abandoned, which is a continuation-in-part of Ser. No. 217,307, Jul. 11, 1988, abandoned.

[51] Int. Cl.⁶ ............................................. F16J 15/32
[52] U.S. Cl. ................................... 277/12; 277/152; 277/153; 384/607; 418/61.3; 418/104
[58] Field of Search .................. 277/9, 12, 35, 152, 277/153, 174, 188 R, 193, 205; 384/124, 140, 147, 148, 161, 452, 455, 484, 607; 418/61.3, 104

[56] References Cited

U.S. PATENT DOCUMENTS

| | | |
|---|---|---|
| 3,254,898 | 6/1966 | Herbener et al. . |
| 3,495,843 | 2/1970 | Andersen et al. . |
| 3,614,183 | 10/1971 | Bereus . |
| 3,785,661 | 1/1974 | White, Jr. . |
| 4,285,643 | 8/1981 | White . |
| 4,300,778 | 11/1981 | Gagne . |
| 4,448,426 | 5/1984 | Jackowski et al. . |
| 4,514,152 | 4/1985 | Takamatsu et al. . |
| 4,522,411 | 6/1985 | Burgan . |
| 4,533,302 | 8/1985 | Begley . |
| 4,755,115 | 7/1988 | Akaike . |
| 4,877,383 | 10/1989 | White, Jr. . |
| 4,981,423 | 1/1991 | Bissonnette ................ 418/61.3 |
| 5,135,369 | 8/1992 | White, Jr. ................ 418/61.3 |
| 5,165,880 | 11/1992 | White . |
| 5,173,043 | 12/1992 | White, Jr. ................ 418/61.3 |
| 5,213,343 | 5/1993 | White, Jr. . |

FOREIGN PATENT DOCUMENTS 2240365  7/1991  United Kingdom ............ 418/61.3

Primary Examiner—William A. Cuchlinski, Jr.
Assistant Examiner—Scott W. Cummings
Attorney, Agent, or Firm—Lightbody & Lucas

[57] ABSTRACT

An improved shaft seal including a relatively uniformed diameter hole in a housing surrounding a relatively uniformed shaft, with a shoulder on the shaft passing axial loads through a thrust bearing and seal to a ring fixedly connected to the housing.

10 Claims, 3 Drawing Sheets

REMOVABLE SHAFT SEAL

This is a continuation-in-part of copending application Ser. No. 07/847,850, filed on Mar. 9, 1992, now U.S. Pat. No. 5,213,343 which is a continuation of Ser. No. 305,376, filed Feb. 1, 1989, abandoned, which is a continuation-in-part of 217,307, filed Jul. 11, 1988, abandoned.

FIELD OF THE INVENTION

This invention relates to an improved seal for hydraulic or pneumatic devices.

BACKGROUND OF THE INVENTION

Seals have been utilized for years in hydraulic and pneumatic devices to prevent the pressurized fluid in the devices from migrating between sections within the device and between the device and the environment. These seals include the shaft seals for rotating shafts protruding from the device so as to allow a rotary input/output without leakage. These shaft seals are typically a circular ring of the resilient material (normally rubber or a synthetic polymer) surrounding the rotating shaft set into a seal carrier or pocket in the fixed housing. However the resilient material frequently can not stand against the pressure exerted upon it; the side load against a shaft seal frequently is many thousands of pounds at the 1000–2000 PSI typically used within the devices. Therefore a backup ring of some nature is normally included with the shaft seal to reinforce the shaft seal. The backup rings themselves, however, are critical components subject to wear, binding, abrasion, and other problems. Rulons are also used to strengthen the seal. One common Rulon is an "L" shaped Teflon Rulon cast into the material of the seal (after first etching the back side of the Rulon for adherence). This Rulon, however, is difficult to manufacture and is also subject to flex differentiation breakdown, wear and other problems.

In addition, the seal itself can be located in a seal carrier necessitating an additional part for manufacture and assembly such as in U.S. Pat. No. 4,285,643, Rotary Fluid Pressure Device. The seal and/or shaft can also be inaccessible without major disassembly of the device such as in U.S. Pat. No. 4,533,302, Gerotor Motor. This precludes easy replacement of the shaft, seal, bearings, wobblestick, and other drive components without complete disassembly of the device.

OBJECTS OF THE INVENTION

It is an object of this invention to provide a useful shaft seal.

It is an object of this invention to improved the longevity of shaft seals.

It is an object of this invention to lower the total service cost of shaft seals.

It is an object of this invention to increase the reliability of shaft seals.

It is an object of this invention to reduce the cost of manufacture of hydraulic devices.

It is an object of this invention to facilitate the maintenance of hydraulic devices.

It is an object of this invention to lower the cost of inventory of hydraulic devices.

Other objects and a more complete understanding of the invention may be had by referring to the following drawings in which:

DRAWINGS

DESCRIPTION OF THE PREFERRED EMBODIMENT

Figure 1:
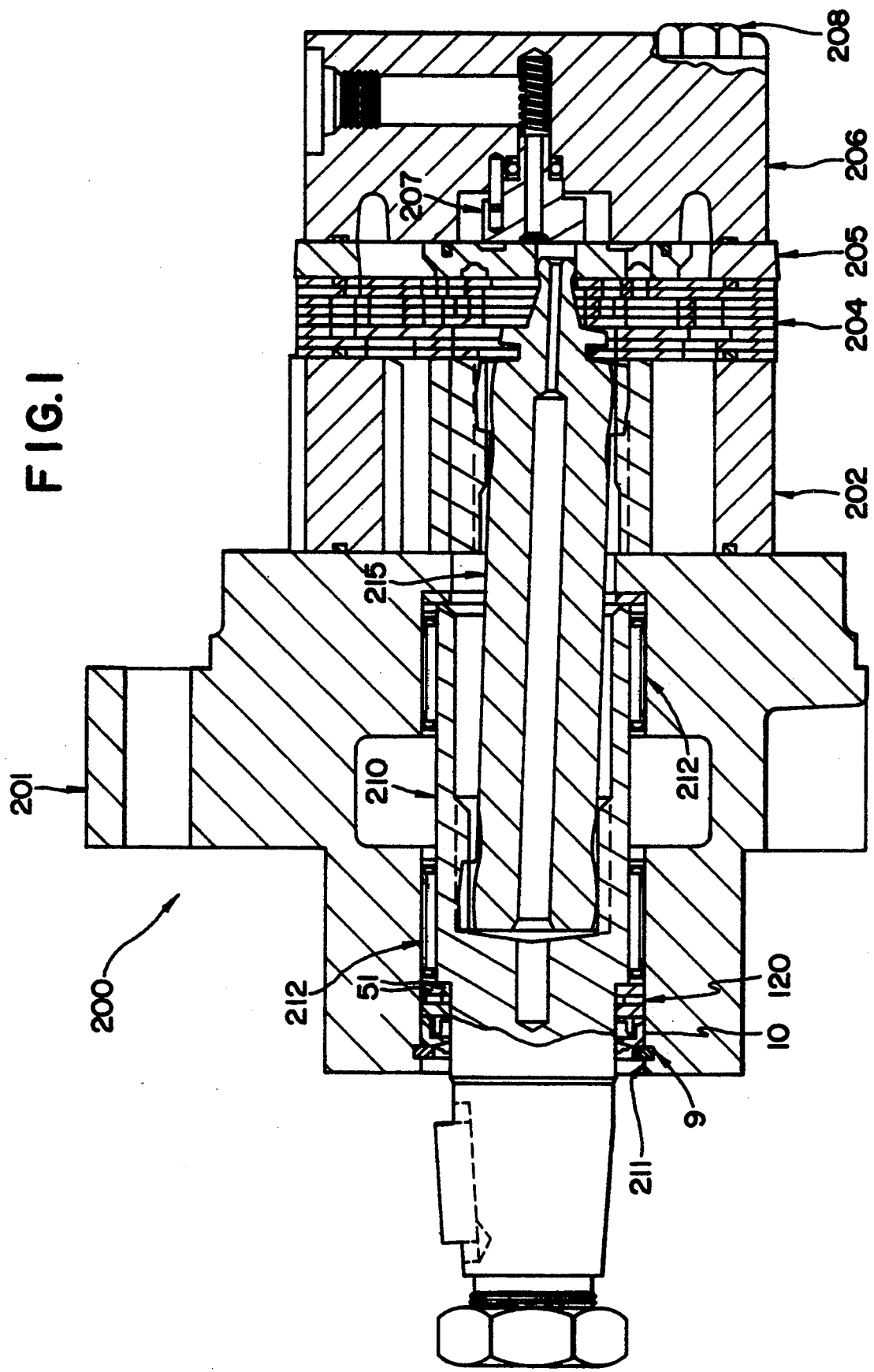
FIG. 1 is a cross-sectional view of a gerotor motor incorporating the shaft seal invention of the application.

The invention of this application is directed towards an improved shaft seal 10.

The particular shaft seal 10 disclosed is utilized in a hydraulic motor 200 having a body or housing made up of a mounting section 201, a gerotor mechanism 202, a manifold plate 204, a valve 205, an end plate 206, a biasing piston 207, and bolts 208.

Figure 2:
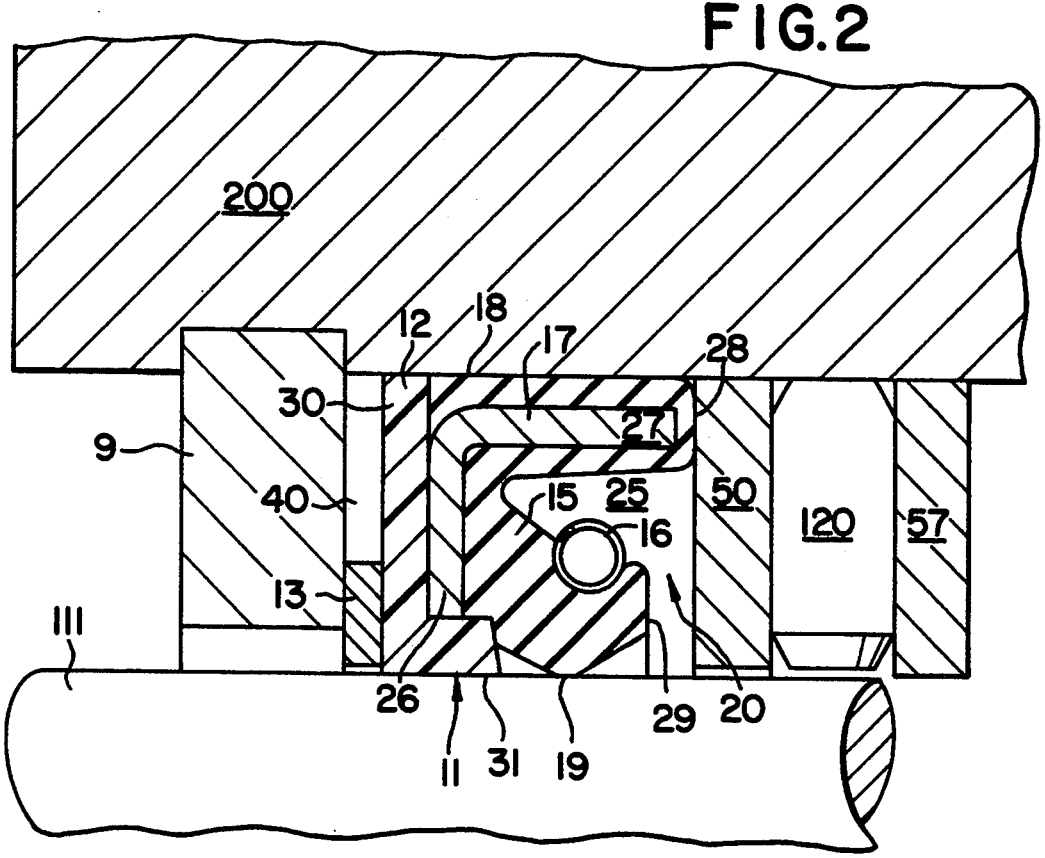
FIG. 2 is a cross-sectional view of the shaft seal of FIG. 1.
Figure 3:
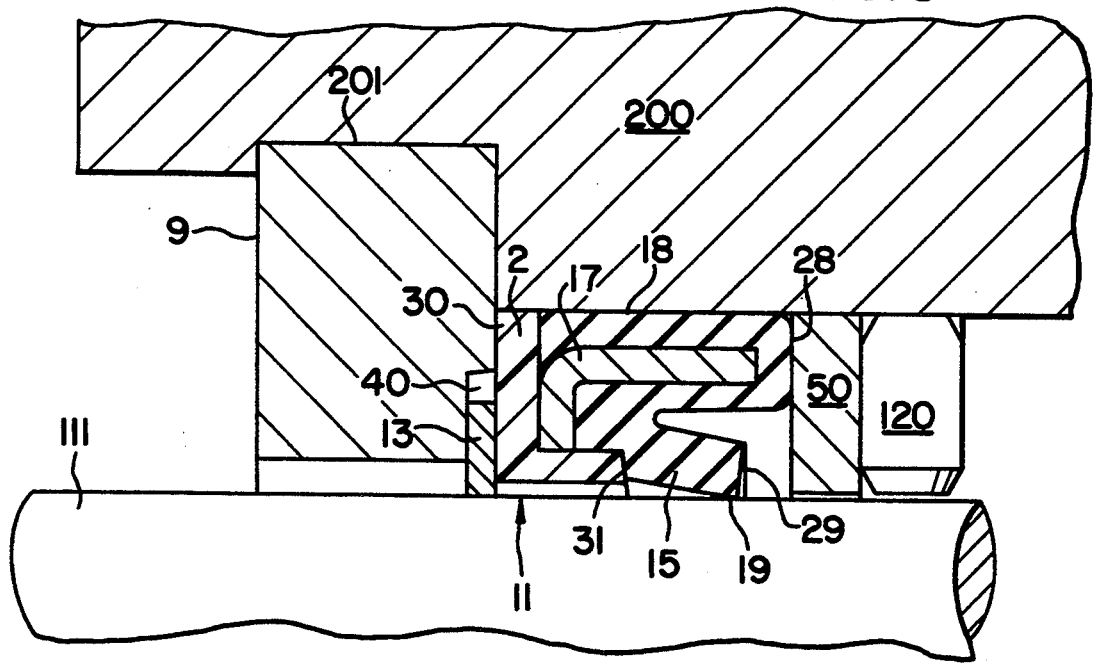
FIG. 3 is a cross-sectional view of a variation of the shaft seal of FIG. 2.

Mounting section 201 is designed to hold the shaft 210 as well as provide the mounting bracket for the gerotor motor. The gerotor mechanism 202 includes a stator and a rotor and generates power in the customary manner. The gerotor mechanism 202 is connected to the shaft 210 by a wobblestick 215 for an offset drive in the customary manner. The manifold plate 204 and valve 205 cooperate in the customary mannes in order to valve the gerotor motor. A biasing piston 207 off of the end of the valve 205 reduces the leakage in this valving mechanism. The bolts 208 extend through all of the parts in order to hold the gerotor motor together. There is a hole 211 extending into the mounting section 201 for locating the drive shaft 210 in position. It is preferred that this hole 211 be of uniform diameter inside of the later described snap ring 9. This facilitates installation and removal of the parts therein. Surrounding roller bearings 212 support the shaft 210 for rotation in respect to the mounting section. Due to the design of the seal as later described in combination with the shape of the hole 211 and shaft 210, the shaft, bearings 212, and seal member can all be accessed from the exterior of the gerotor motor 200 for infield maintenance and replacement without compromise to the integrity of the fluid areas of the gerotor device. In this respect, the biasing piston 207 facilitates the matter by isolating the section of the gerotor motor surrounding the wobblestick 215 from high pressure fluid. Designs accomplishing this are set forth in White U.S. Pat. No. 4,877,383, Device Having A Sealed Control Opening And An Orbiting Valve, or in White U.S. application 724,903, Gerotor Device With Biased Orbiting Valve And Drain Connection Through Wobblestick. The shaft seal 10 itself includes a seal member 11, and intermediate member 12, a backup ring 13, and a snap ring 9 (FIGS. 1–3).

The seal member 11 is the primary shaft seal. The preferred seal member 11 includes a resilient body section 15, an optional reinforcing spring 16 and backing plate 17.

The resilient body section 15 of the seal member 11 is made of some sort of resilient material such as rubber or a synthetic polymer. The preferred embodiment is injected molded of Viton (TM Dupont) plastic.

The outer surface 18 of the seal member 11 performs a sealing function against the surrounding device, in the embodiment shown the inner surface of the hole 211 in the housing 200 of a hydraulic gerotor device. It is preferred that the outer surface 18 be circumferentially ridged so as to produce a series of discrete sealing contacts with the inner surface of the device. (This ridging and other details of the seal 11 are set out in U.S. application 305,376, the contents thereof are incorporated herein by reference.) This series contact provides a better seal than a single flat seal. The series contact also facilitates sealing by compensating for misalignments, minor bumps, high points, and other deviances from a perfect circle present in either or both of the seal and device. This is relatively important in a device wherein it is contemplated that the shaft 210 and other internal power mechanisms of the gerotor motor may be removed out of the mounting section 201 of the gerotor motor and replaced with alternate units. In addition the series contact provides a resiliency to surrounding surface allowing for some sort of radial movement between the seal member 11 and body. This movement facilitates the sealing function of the seal edge 19 by creating an additional location for radial motion of the seal member 11. It is preferred that the outer lip 28 of the outer surface 18 extend a short distance beyond the edge steel of the hole in the housing 200 such that the resilient material of the seal must be compressed (0.020 preferred) before a solid contact occurs. This provides a cushion for the bearing 120. Note that this lip 28 in the preferred embodiment is in physical contact with the bearing 120 through a backing plate 50. This passes the forces from the bearing to the snap ring 9 as later described. Note also that this lip 28 in the preferred embodiment is off center in respect to the bearing 120. This aids in sealing the outer surface 18 of the seal member 11 as later described. If desired, this lip 28 could be centered in respect to the bearing 120 or extended so as to provide for a more parallel to the shaft force transference. Since the diameter of the hole 211 is larger outside of the snap ring 9, the seal member 11 can be installed and removed with minimal damage to its outer surface 18 by the snap ring groove.

The inner surface 19 of the seal member 11 performs a sealing function against the other part of the device, in the embodiment disclosed a rotary shaft 210. It is preferred that the inner surface 19 be an edge so as to produce a single sealing contact with a rotating shaft such as that shown. This single contact produces less friction and wear than a more numerous number of contacts. In addition the singular contact allows for some sort of movement/alignment between the seal member 11 and shaft 210. Other shapes and/or contacts are possible if necessary or desired. The outer lip 29 of the inner edge 19 of the seal member 11 is recessed in respect to the outer lip 28 of the outer surface 18. This recess (0.040 preferred) insures that most of the axial load on the seal member 11 through the relatively stationary (and reinforced) outer surface 18. This allows the inner edge 19 to float irrespective of axial loads on the seal. The inner edge 19 of the seal member 11 preferably has an initial diameter slightly less than the diameter of the rotary shaft 210. This insures a seal at this point. The reinforcing spring 16 of the embodiment of FIG. 1 facilitates the functioning of the inner edge 19 of the seal member 11 by creating a resilient circular shape for the absorption/transference of the forces on/from the inner edge 19 of the seal member 11.

The seal member 11 prevents dirt contamination of the thrust bearing 120 and other components within the housing as well as providing a pressure seal for the device.

The central section 20 of the seal member 11 seals the space between the outer surface 18 and inner edge 19. One part 25 of the central section 20 is cutaway so as to facilitate a floating movement of the inner edge 19 of the seal member 11.

The outer diameter of the seal member 11 at the outer surface 18 is preferably slightly less than the inner diameter of the hole 211 in the housing 200 when such seal member 11 is uninstalled. This facilitates the assembly of the device by substantially reducing the friction between the seal 11 and the device. Once installed and pressurized, the diameters will be equalized by the pressure and the compression caused by physical forces on the outer lip 28 of the seal.

The backing plate 17 is an "L" shaped member located within the resilient body section 15 of the seal member 11. The inward extending portion 26 of the backing plate 17 is exposed to the radial surface of the seal member 11 adjacent to the central section 20 of the seal member 11. This location insures a flat, well supported contact plane for the backing plate 17 (i.e. no resilient material between the backing plate 17 and the solid surface of the neighboring device). This is preferred. The other portion 27 of the backing plate 17 extends under the outer surface 18 of the seal member 11. This other portion 27 supports the outer surface 18 of the seal member 11 against the surrounding housing 200. Since the inward extending portion 26 of the backing plate 17 is relatively lengthy, the outer tip 28 of the outer surface 18 of the seal member 11 is held in solid even contact with the surrounding device. The other portion 27 also strengthens the seal member 11 and intermediate member is as later described.

Figure 4:
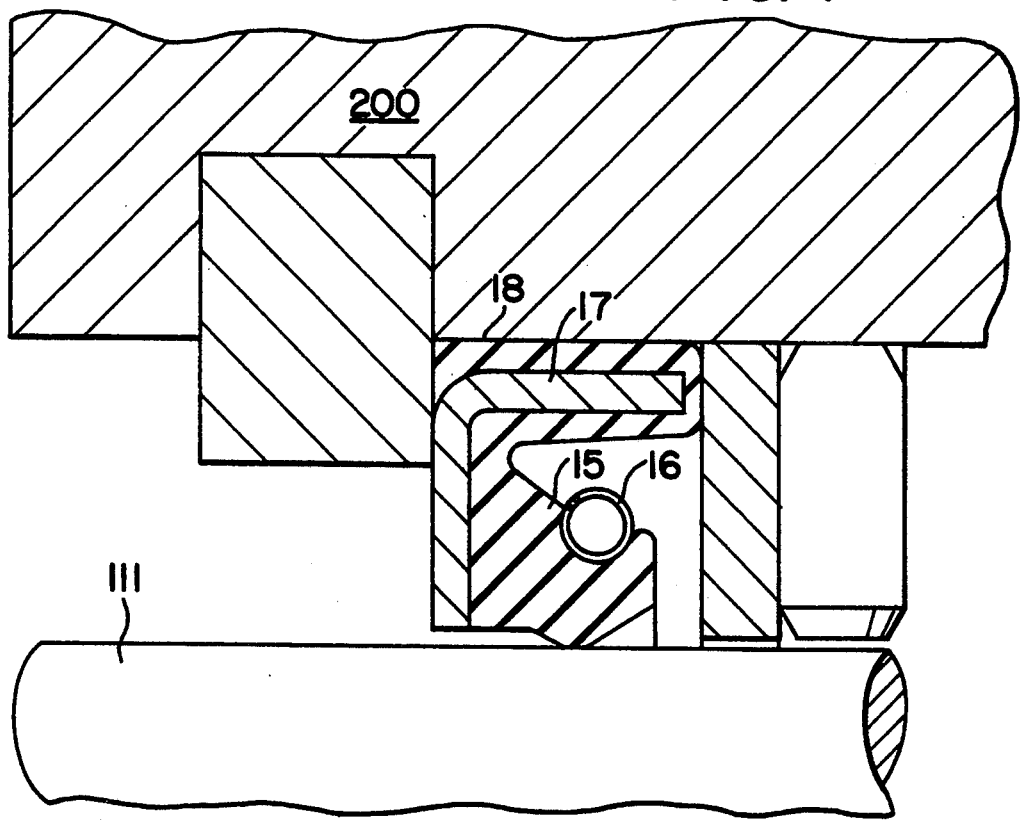
FIG. 4 is a cross-sectional view of a further modified shaft seal like FIG. 2 incorporating the invention.
Figure 5:
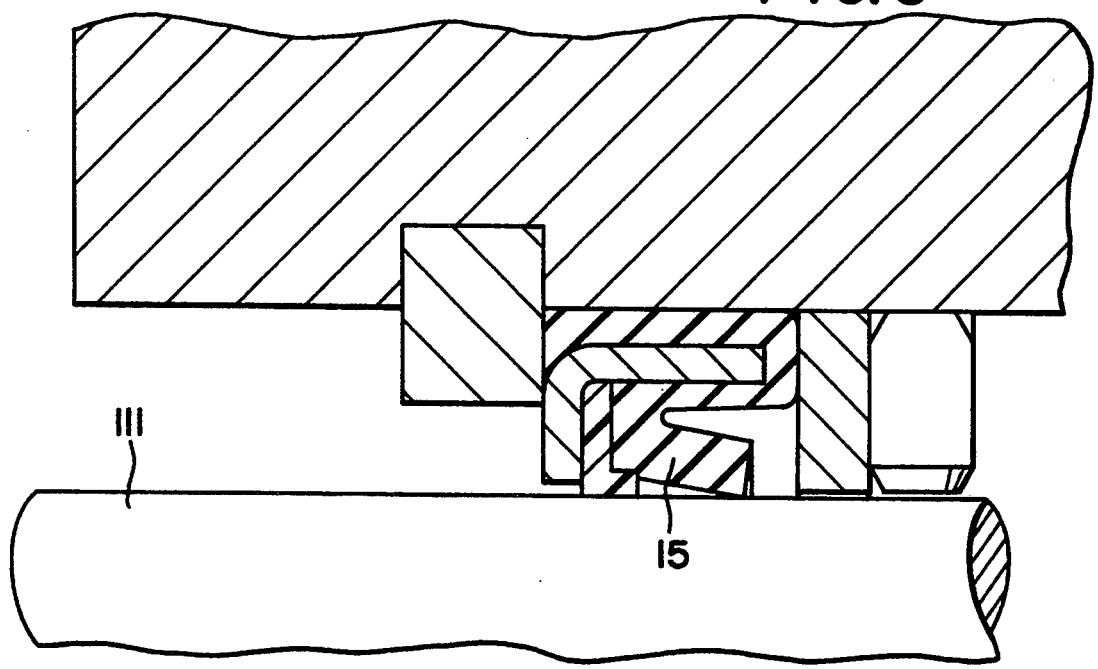
FIG. 5 is a cross-sectional view of a variation of the modified shaft seal of FIG. 4.

An intermediate member 12 is optionally located between the seal member 11 and the axial portion of the snap ring 9 and also between the seal member 11 and the backup ring 13 (contrast FIGS. 2-3 with FIGS. 4-5). The intermediate member 12 transfers and spreads out the axial forces between the seal member 11 and these members. The outwardly extending radial edge 30 of the intermediate member 12 provides a bed for the seal member 11 (including the inward extending portion 26 of the backing plate 17). The outward radial edge 30 also, being trapped between the seal member 11 and snap ring 9 and housing 200, holds the intermediate member 12 in place against rotary and other forces. The other portion 27 of the backing plate 17 strengthens the seal member 11 and intermediate member 12 by absorbing most of the inward forces on the intermediate member 12 and seal member 11, especially as their critical lower inner joint. Without this absorption the member would have an increased tendency to extrude inwardly, deforming up to and including into a damaging contact with the shaft 210. In the preferred embodiment described the other portion 27 of the backing plate 17 reduces the inward forces on these members about 3 to 1. In the preferred embodiment disclosed, due to the isolation of the area around the wobblestick 215 from high pressure fluid, the intermediate member 12 can be omitted without significant compromise to the longevity of the seal 10. If, however, the invention were to be utilized in can ordinary gerotor device wherein the area around the wobblestick 215 was pressurized to perhaps 2000 PSI, the intermediate member 17 would reduce the pressure from substantially 2000 PSI to 700 PSI. This reduction in force would be significant in this type of device. In any device, the reduction in force allows one to design in tighter tolerances for longer lasting devices while reducing the possibility that the members will damagingly deform into contact with the shaft 210. (If a member does damagingly deform into a rotating shaft such member will have an increased tendency to rotate with the shaft, a tendency leading to its subsequent destruction if non-uniform or of significant pressure. This is an especially important consideration in respect to the seal 11 and the inner edge of the intermediate member 12—the end of the flange 31.) The inwardly extending flange 31 of the intermediate member 12 transfers the axial forces between the inner edge 19 of the seal member 11 and the backup ring 13. This aids in the support of the seal member 11. The outer diameter of the intermediate member 12 is substantially equal to the outer diameter of the seal member 11 when in its use position. The flange 31 is dimensioned to extend inwardly of the seal member 11 into contact with the inner edge 19 of the seal member 11. This aids in the support of the critical section. The preferred intermediate member 12 allows the seal 11 to be incorporated into higher pressure applications than otherwise (by physically aiding in the support of the resilient body section 15). As set forth in devices having lower pressure requirements, such as the preferred embodiment of U.S. Pat. No. 4,877,383 issued Oct. 31, 1989, Device Having A Sealed Control Opening And An Orbiting Valve, the intermediate member 12 could be omitted (FIG. 4) or relocated (FIG. 5).

The preferred intermediate member 12 is constructed of a material having a hardness lower than the shaft with which the seal 10 is going to be utilized, preferably a hardness slightly lower than the shaft but significantly more than the seal 11. With this hardness the intermediate member 12 will be sacrificed in respect to the shaft while at the same time providing significant support for the seal 11. An example of such a material is Tetralon 902 (a Teflon material including 25% woolsenite—a calcium metacilitate itself 48% calcium oxide, 49% silicon dioxide, 1% $Fe_2O_3$, 1% ALO, 0.1%$O_2$ and 0.05%MgO). This material has a hardness lower than the shaft (i.e. lower than a typical RC 58 hardness for example) and much greater than the rubber seal 11. The Tetralon 902 also provides the proper compressibility and strength for the intermediate member 11. Other materials could also be used. The difference in hardness insures that the intermediate member 12 would be sacrificed and not the more difficult and expensive to replace shaft 210. Also the lower hardness residue of wear would be less likely to damage the other parts of the device than would shaft residue. With this strength, the intermediate member 12 provides a greater support for the seal member 11 than is otherwise possible (since most of the seal 11 is supported by the intermediate member 12, the seal 11 will not extrude as much into the rotating shaft 210 as much as it otherwise would).

The inner diameter of the flange 31 of the intermediate member 12 is preferably the same as the outer diameter of the shaft 210 (FIG. 2). With this diameter the flange 31 would be relatively immovable upon the application and maintenance of a significant pressure (i.e. the flange 31 would be relatively impervious to extrusion). With this diameter the flange 31 provides a significant and reliable support for the inner edge 19 of the seal 11 while seating well against the shaft 210. The fact that the flange 31 does contact the shaft 210 is accepted as a price for these attributes (i.e. the increase in seal longevity etc. is worth the friction losses etc.). With the flange 31 having such a diameter the effect of high pressure on the seal 10 would be a slight malformation of the inner edge 19 of the seal 10, and this malformation would be limited by the physical presence of the flange 31: The other dimensions of the seal 10 would be relatively stable.

In the device of FIG. 3 the inner diameter of the flange 31 is shown initially greater than the outer diameter of the shaft 210; the flange 31 is designed to avoid shaft 210—intermediate member 12 contact upon installation and to limit such contact during use. A harder substance such as Teflon with a 25% fiberglass reinforcing could therefore be utilized than in the preferred embodiment of FIG. 2 (recognizing of course that the RC 64 of a typical piece of fiberglass is other than preferable). This harder substance would strengthen the intermediate member at the risk of possible increased damage on breakdown and/or increased malformation of the seal 11 on the application of significant pressure: a risk worth taking in certain types of applications (i.e. very high pressure where the added strength is desired). (The parts of any seal will extrude eventually. With a harder intermediate member 12 this extrusion will occur at a higher pressure than otherwise. This in combination with the spacing from the shaft of the inner diameter of the intermediate member 12 of FIG. 3 lowers the inward forces between these members and the shaft 210.)

A backing ring 13 is optionally included. This backing ring 13 is designed to provide an axial support for the inner edge 19 of the seal member 11. The preferred backing ring 13 is a thin steel ring having an inner diameter slightly greater than the shaft 210 and an outer diameter a little more than the diameter of the inner edge of the inward extending portion 26 of the backing plate 17. The backing ring 13 itself is preferably axially positioned adjoining the intermediate member 11. The dimension of the space 40 about the backup ring 13 is such that this ring 13 can at least initially float in respect to the housing 200. If the space 40 is minimal (FIG. 3), less extrusion of the seal 11 will occur at a cost of some machining (in this instance of the snap ring 9). It is preferred that the inner diameter of the backing ring be only a few thousands larger than the diameter of the shaft 210. This insures the maximum support for the inner edge 19 of the seal member 11. The intermediate member 12 thus allows this backing ring 13 to float relative to the seal member 11 while still providing the axial support for such seal 11.

A thrust plate 50 is optionally and preferably included between the seal member 11 and the thrust bearing forces on the thrust bearing 120. This is particularly important with the off center contact at the outer lip 28 of the seal member 11 as shown in the preferred embodiment.

There is preferably a slight clearance, 0.002 or 0.003 preferred, between the outer diameter of the thrust plate 50 and the inner diameter of the hole 11 in the device and between the inner diameter of the thrust plate 50 and the shaft 210. This provides a solid bedding support for the bearing 120. The thickness of the thrust plate 50 is selected so as to pass the thrust on the bearing 120 to the seal member 11 without significant warping (even with the limited off center contact of the preferred embodiment).

The thrust plate 50 also serves to reduce the efficiency of heat transfer between the thrust bearing 120 and the seal member 11.

A separate thrust plate 51 is optionally and preferably located on the other side of the thrust bearing between the bearing 120 and the shoulder of the shaft 210. This thrust plate 51 passes the forces from such shoulder to the entire surface of the thrust bearing 120. This equalizes the pressures on the bearing 120. This same functioning could be provided by making a flange equal to the plate 51 integral with the shaft 210.

In all embodiments of the disclosed invention, upon simple removal of a snap ring 9 from the mounting section 201, the seal 10, thrust bearing 120, shaft 210, shaft bearing 212, and wobblestick 215 can be totally removed from the body of the gerotor motor without in any way compromising the critical valving and operational seals for the gerotor mechanism 202, manifold plate 204, valve 205, and if applicable, the various piping interconnected to the gerotor motor. This construction allows a manufacturer to completely assemble gerotor motors without consideration to the actual physical design of the various items which can be removed. For example, the shaft 210 shown in FIG. 1 of this application contains a square key to interlock the shaft to a physical item being driven by the shaft. Further, the physical item is interconnected to the shaft 210 by a nut extending off of the end of the shaft 210. The invention, however, allows the manufacturer of someone further down the line to replace the square key shaft 210 with an alternate shaft, for example a shaft having drive splines and no nut, at minimal expense and bother. This interchange can also occur without compromise to the fluidic integrity of the critical gerotor mechanism and valve section. This allows the manufacturer to keep a single inventory of a particular type of hydraulic device, knowing that the shaft 210 can be successfully interchanged later on in the life of the hydraulic device. Further, the seal 10, bearings 120, 212, and wobblestick 215 can likewise be interchanged and/or replaced during the service life of the hydraulic device. This further allows one to extend the longevity of the hydraulic device. Note that in the preferred embodiment the hole 211 is shown having a uniform diameter and length. If this uniform diameter and length is incorporated into many hydraulic devices across a particular company's product line, this would allow a single shaft 210, and wobblestick 215 combination to be utilized with many differing motors with the bearings 120, 212 along with the seal 10 varying according to the force and pressure requirements for the hydraulic device. This would further reduce the inventory requirements of and facilitate the life of hydraulic device. The diameter of the hole 211 could also vary along its length. While this would necessitate a special boring tool and/or additional manufacturing operations, it would also allow a manufacturer to size components differently. In any event, it is preferred that the inner diameter of the hole 211 be equal to or greater than the outer diameter of any part that is to be removed between such part and the exposed end of the hole 211. This would allow for the removal of this part without major disassembly.

Although this invention has been described in its preferred form with a certain degree of particularity, it is to be understood that numerous changes may be made without departing from the invention as hereinafter claimed.

What is claimed is:

1. A seal combination for a hydraulic device shaft having axial pressure thereon located in a bore in a housing, said combination comprising the shaft having an outer diameter, the bore having an inner diameter, a shoulder, said shoulder being connected to the shaft extending outwardly therefrom, a thrust bearing, said thrust bearing being located on the shaft next to said shoulder, said thrust bearing being spaced from a solid interconnection to the housing on the opposite side of said thrust bearing from said shoulder, a seal, said seal being located on the shaft next to said thrust bearing on the opposite side from said shoulder, said seal having an outer diameter, said outer diameter of said seal being substantially equal to the inner diameter of the bore, said seal having an inner diameter, said inner diameter of said seal being substantially equal to the outer diameter of the shaft, a ring, said ring being located surrounding the shaft next to said seal on the opposite side from said thrust bearing, said ring having an inner diameter, said inner diameter of said ring being less than said outer diameter of said seal and means to connect said ring to said housing whereby the axial pressures on the shaft are passed from said shoulder through said thrust bearing and said seal to said ring and housing.

2. The improved seal combination of claim 1 wherein the shaft has an end protruding from a housing at an end thereof, and said shaft being removable through the end of the housing.

3. The improved seal combination of claim 1 wherein there is pressure on the inside of the hydraulic device and said seal retains the pressure within the hydraulic device as well as preventing dirt contamination.

4. The improved seal combination of claim 1 wherein the inner diameter of the bore is slightly larger than the pre-installed outer diameter of said seal.

5. A seal combination for a hydraulic device shaft having axial pressure thereon located in a bore in a housing, said combination comprising the shaft having an outer diameter, the bore having an inner diameter, a shoulder, said shoulder being connected to the shaft extending outwardly therefrom, a thrust bearing, said thrust bearing being located on the shaft next to said shoulder, said thrust bearing being spaced from a solid interconnection to the housing on the opposite side of said thrust bearing from said shoulder, a seal, said seal being located on the shaft next to said thrust bearing on the opposite side from said shoulder, said seal having an outer diameter, said outer diameter of said seal being substantially equal to the inner diameter of the bore, said seal having an inner diameter, said inner diameter of said seal being substantially equal to the outer diameter of the shaft, a backing plate, said backing plate having a portion with an outer and inner diameter, said backing plate being located surrounding the shaft next to said seal on the opposite side of said thrust bearing, a ring, said ring being located surrounding the shaft next to said backing plate on the opposite side from said seal, said ring having an inner diameter, said inner diameter of said ring being less than said outer diameter of said backing plate and means to connect said ring to said housing whereby the axial pressures on the shaft are passed from said shoulder through said thrust bearing, seal and backing plate to said ring and housing.

6. A seal combination for a hydraulic device shaft having axial pressure thereon located in a bore in a housing, said combination comprising the shaft having an outer diameter, the bore having an inner diameter, said inner diameter of the bore being uniform in diameter about said seal combination, a shoulder, said shoulder being connected to the shaft extending outwardly therefrom, a thrust bearing, said thrust bearing being located on the shaft next to said shoulder, said thrust bearing having an outer diameter, said outer diameter of said thrust bearing being substantially equal to the inner diameter of the bore, said thrust bearing having an inner diameter, and said inner diameter of said thrust bearing being substantially equal to the outer diameter of the shaft, a seal, said seal being located on the shaft next to said thrust bearing on the opposite side from said shoulder, said seal having an outer diameter, said outer diameter of said seal being substantially equal to the inner diameter of the bore, said seal having an inner diameter, said inner diameter of said seal being substantially equal to the outer diameter of the shaft, a ring, said ring being located surrounding the shaft next to said seal on the opposite side from said thrust bearing, said ring having an inner diameter, said inner diameter of said ring being less than said outer diameter of said seal, said outer diameter of said ring being at least equal the diameter of the bore, and means to connect said ring to said housing whereby the axial pressures on the shaft are passed from said shoulder through said thrust bearing, and said seal to said ring and housing.

7. The improved seal combination of claim 6 characterized by the addition of a thrust plate, said thrust plate being located on the shaft between said thrust bearing and said seal, said thrust plate having an outer diameter, said outer diameter of said thrust plate being substantially equal to the inner diameter of the bore, said thrust plate having an inner diameter and said inner diameter of said thrust plate being substantially equal to the outer diameter of the shaft.

8. The improved seal combination of claim 6 characterized by the addition of a backup ring, said backup ring being located about the shaft between said seal and said ring, and said backup ring having an inner diameter substantially equal to the outer diameter of the shaft.

9. A seal combination for a hydraulic device shaft having axial pressure thereon located in a bore in a housing, said combination comprising the shaft having an outer diameter, the bore having an inner diameter, said inner diameter of the bore being uniform in diameter about said seal combination, a shoulder, said shoulder being connected to the shaft extending outwardly therefrom, a thrust bearing, said thrust bearing being located on the shaft next to said shoulder, said thrust bearing having an outer diameter, said outer diameter of said thrust bearing being substantially equal to the inner diameter of the bore, said thrust bearing having an inner diameter, and said inner diameter of said thrust bearing being substantially equal to the outer diameter of the shaft, a seal, said seal being located on the shaft next to said thrust bearing on the opposite side from said shoulder, said seal having an outer diameter, said outer diameter of said seal being substantially equal to the inner diameter of the bore, said seal having an inner diameter, said inner diameter of said seal being substantially equal to the outer diameter of the shaft, a backing plate, said backing plate having a portion with an outer and inner diameter, said backing plate being located surrounding the shaft next to said seal on the opposite side of said thrust bearing, an intermediate member, said intermediate member being located surrounding the shaft next to said backing plate on the opposite side from said seal between said backing plate and said ring, said intermediate member having an outer diameter, said intermediate member having an inner diameter, said inner diameter of said intermediate member being substantially equal to the outer diameter of the shaft, a ring, said ring being located surrounding the shaft next to said backing plate on the opposite side of said intermediate member from said seal, said ring having an inner diameter, said inner diameter of said ring being less than said outer diameter of said backing plate, said outer diameter of said ring being at least equal the diameter of the bore, and means to connect said ring to said housing whereby the axial pressures on the shaft are passed from said shoulder through said thrust bearing, seal and backing plate to said ring and housing.

10. The improved seal combination of claim 9 characterized in that said outer diameter of said intermediate member is substantially equal to said inner diameter of the bore.

* * * * *